(12) United States Patent
Vartti et al.

(10) Patent No.: US 7,496,715 B1
(45) Date of Patent: Feb. 24, 2009

(54) PROGRAMMABLE CACHE MANAGEMENT SYSTEM AND METHOD

(75) Inventors: Kelvin S. Vartti, Hugo, MN (US); Ross M. Weber, Coon Rapids, MN (US)

(73) Assignee: Unisys Corporation, Blue Bell, PA (US)

( * ) Notice: Subject to any disclaimer, the term of this patent is extended or adjusted under 35 U.S.C. 154(b) by 769 days.

(21) Appl. No.: 10/620,406

(22) Filed: Jul. 16, 2003

(51) Int. Cl.
 *G06F 12/08* (2006.01)
(52) U.S. Cl. ...................... 711/144; 711/145
(58) Field of Classification Search .............. 711/141, 711/118, 120, 121, 145, 144
See application file for complete search history.

(56) References Cited

U.S. PATENT DOCUMENTS

| | | | | |
|---|---|---|---|---|
| 5,644,753 | A | * | 7/1997 | Ebrahim et al. ............. 711/131 |
| 5,913,224 | A | * | 6/1999 | MacDonald ................ 711/125 |
| 6,148,370 | A | * | 11/2000 | Kobayashi .................. 711/118 |
| 6,263,407 | B1 | * | 7/2001 | Arimilli et al. .............. 711/144 |
| 6,647,469 | B1 | * | 11/2003 | Sharma et al. .............. 711/147 |
| 6,839,806 | B2 | * | 1/2005 | Murakami et al. .......... 711/118 |
| 6,993,630 | B1 | * | 1/2006 | Williams et al. ............ 711/137 |
| 7,181,572 | B2 | * | 2/2007 | Walmsley ................... 711/128 |

* cited by examiner

*Primary Examiner*—Pierre-Michel Bataille
(74) *Attorney, Agent, or Firm*—Charles A. Johnson; Robert Marley

(57) ABSTRACT

A memory control system and method is disclosed. The system includes cache tag logic and an optional cache coupled to a main memory. If available, the cache retains a subset of the data stored within the main memory. This subset is selected by programmable control indicators. These indicators further control which data will be recorded by the tag logic. The indicators may select the sub-sets based on which type of memory request results in the return of data from the main memory to the cache, for example. Alternatively, or in addition, these indicators may specify the identity of a requester, a memory response type, or a storage mode to control the selection of the sub-sets of data stored within the cache and recorded by the tag logic. In one embodiment, data may be tracked by the cache tag logic but not stored within the cache itself.

29 Claims, 5 Drawing Sheets

PROGRAMMABLE CACHE MANAGEMENT SYSTEM AND METHOD

RELATED APPLICATIONS

The following co-pending applications of common assignee have some subject matter in common with the current application:

Ser. No. 10/600,218 entitled "Data Acceleration Mechanism for a Multiprocessor Shared Memory System", filed on Jun. 20, 2003 which is incorporated by reference in its entirety.

Ser. No. 11/620,515 entitled "Programmable System and Method for Accessing a Shared Memory", filed on even date herewith, and incorporated herein by reference in its entirety.

FIELD OF THE INVENTION

The present invention generally relates to methods and apparatus for controlling a multi-processor shared memory system; and, more particularly, relates to a programmable system and method for controlling the replacement of data within a shared cache.

DESCRIPTION OF THE PRIOR ART

Data processing systems are becoming increasing complex. Some systems, such as Symmetric Multi-Processor computer systems, couple two or more Instruction Processors (IPs) and multiple Input/Output (I/O) Modules to shared memory. This allows the multiple IPs to operate simultaneously on the same task, and also allows multiple tasks to be performed at the same time to increase system throughput.

As the number of units coupled to a shared memory increases, more demands are placed on the memory and memory latency increases. To address this problem, high-speed cache memory systems are often coupled to one or more of the IPs for storing data signals that are copied from main memory or from other cache memories. These cache memories are generally capable of processing requests faster than the main memory while also serving to reduce the number of requests that the main memory must handle. This increases system throughput.

In more complex data processing systems, multiple levels of cache memory may be utilized. For example, an IP may be coupled to one or more levels of cache memory that are dedicated to storing only the data requested by that IP. An IP may be further coupled through its dedicated cache memories to one or more additional levels of cache memory that are shared between multiple IPs. This type of hierarchical memory structure is adapted to minimize the number of references that must be made to main memory for data, thereby increasing overall throughput.

In a system employing one or more levels of cache memory, one way to optimize processing throughput is by increasing cache hit rates. If a majority of data requests can be satisfied without having to reference main memory, system performance can be enhanced. Cache hits rates can, in some cases, be improved by employing a replacement mechanism that ages out data that is least likely to be referenced in the near future. For example, a least-recently used mechanism may be employed for this purpose.

Cache hit rates might also be increased by controlling the types of data that are eligible for storage within a given cache. For example, some prior art systems may store only instructions in certain caches, whereas other caches may be dedicated to storing operands. In these types of prior art systems, the control over which data may be retained within a given cache is fixed within the logic design. There is no ability to alter this control mechanism as processing needs change.

What is needed, therefore, is an improved system and method for flexibly controlling the storing of data to a cache.

SUMMARY OF THE INVENTION

The current invention provides an improved memory control system and method. The system includes a cache having a cache memory for storing data and cache tag logic for tracking data that may, or may not, be stored within the cache memory. The types of data stored within the cache memory, as well as the types of data that are tracked by the cache tag logic, are controlled by programmable indicators.

In one exemplary embodiment, the cache is coupled to a main memory. The cache is further coupled to one or more requesters such as instruction processors. Data may be retrieved from the main memory and stored in the cache for use by the requesters.

In one embodiment, when a requester makes a request for data to the cache, the request includes a request type. This request type may indicate the type of access rights that are requested for the data and/or the types of operations that will be performed on the data. At least one of the programmable control indicators identifies one or more of these request types. Data that is retrieved from the main memory in response to an identified request type is not replaced within the cache.

In one exemplary embodiment of the invention, a request type is provided to indicate that the requester will update the requested data. Data that is retrieved from main memory as a result of this request type will be recorded by the cache tag logic, but will not be stored to the cache memory. This increases cache efficiency by eliminating a storage operation that must be repeated after the updated data is returned by the requester to the cache. In another mode of operation, data retrieved in response to this request type will not be recorded by the cache tag logic or replaced within the cache.

According to another aspect of the invention, when data is retrieved from the main memory for storage within the cache, the data is accompanied by a response type. This response type may, for example, indicate the type of access rights that are granted with the data. In one embodiment, at least one of the control indicators selects one or more of the response types. Data is only replaced within the cache if it is returned with one of the selected response types.

In yet another embodiment of the invention, at least one of the control indicators identifies one or more of the requesters. When requested data is retrieved from the main memory, it is only replaced within the cache tag logic if its retrieval was prompted by a request from one of the identified requesters.

According to another aspect of the invention, data retrieved from the main memory may be updated by a requester. This updated data may then be returned to the cache. The updated data is stored to the cache or forwarded to the main memory based, at least in part, on the state of the programmable control indicators. This determination may further be based on whether a cache hit occurred for the data.

In one embodiment, multiple requesters each implement a snoop protocol on a shared bus that is coupled to the cache. Updated data may be returned to the cache during a Processor Bus Write-Back (PBWB) operation that occurs after a request for that data was snooped by a requester resident on the bus. Updated data may also be returned to the cache during another type of operation known merely as a Write-Back (WB) operation, which is generally performed by a requester that no longer requires access to the data, and is therefore returning that data to the cache. One or more control indicators selects whether PBWB and/or WB operations will prompt the storing of the updated data to the cache, or whether one or both of these operation types will result in the return of the data to the main memory. This control may further take into consideration whether a cache hit occurred for the data, as mentioned above.

In one embodiment of the invention, the programmable control indicators identify one or more storage modes. In one storage mode, all WB and PBWB operations result in the storing of updated data to the cache. In another mode, WB operations will not result in the storing of updated data to the cache if a cache miss occurs. Additional storage modes may be defined. For example, in the manner discussed above, one or more of these storage modes may disable the storing of data to cache if that data is retrieved from main memory as a result of one or more selected request types.

According to yet another aspect, data may be provided by the main memory to the cache before all memory coherency operations have been completed for the data. This generally involves a situation wherein data is provided to be updated by one of the requesters before all read-only copies of the data residing within the memory system have been invalidated. This type of operation is provided to increase memory throughput. However, these situations must be tracked to ensure that memory incoherency does not result. In this embodiment, updated data cannot be returned to main memory until all incomplete coherency actions for that data, or other associated data, are completed.

The system may further include mode switch logic. Mode switch logic automatically modifies one or more of the programmable indicators in response to system conditions. For example, automated mode switch logic may monitor the number of requests that are of a type that guarantees to update the requested data and that result in the retrieval of the data from main memory. If this number exceeds a predetermined threshold value, the mode switch logic may modify the controllable indicators to a setting that allows these types of requests to be handled by providing the data to the requester, but preventing the replacement of data within the cache. This will increase the bandwidth of the cache.

According to one aspect of the invention, a memory system is disclosed. The memory system includes cache tag logic and a programmable storage device to store one or more indicators. A control circuit is coupled to the storage device and to the cache tag logic to receive data, and to determine whether to update the cache tag logic for the data based on the one or more indicators. The system may further include a cache coupled to the cache tag logic to store the data. The control circuit includes circuits to determine whether to store the data to the cache based on the one or more control indicators.

According to another embodiment, a method is provided for controlling a memory system that includes cache tags and one or more control indicators. The method includes obtaining data, and determining whether to update the cache tags to record the data based on the state of one or more of the control indicators. The memory system may further include a cache. In this instance, the method comprises determining whether to store the data in the cache based on the state of one or more of the control indicators.

According to still another aspect, a memory system is described. The memory system includes main memory means for storing data, cache means for storing a subset of the data, and programmable storage means for storing control indicators to select the subset of the data.

Other scopes and aspects of the invention will become apparent to those skilled in the art from the following description and accompanying drawings.

DETAILED DESCRIPTION OF THE DRAWINGS

Figure 1:
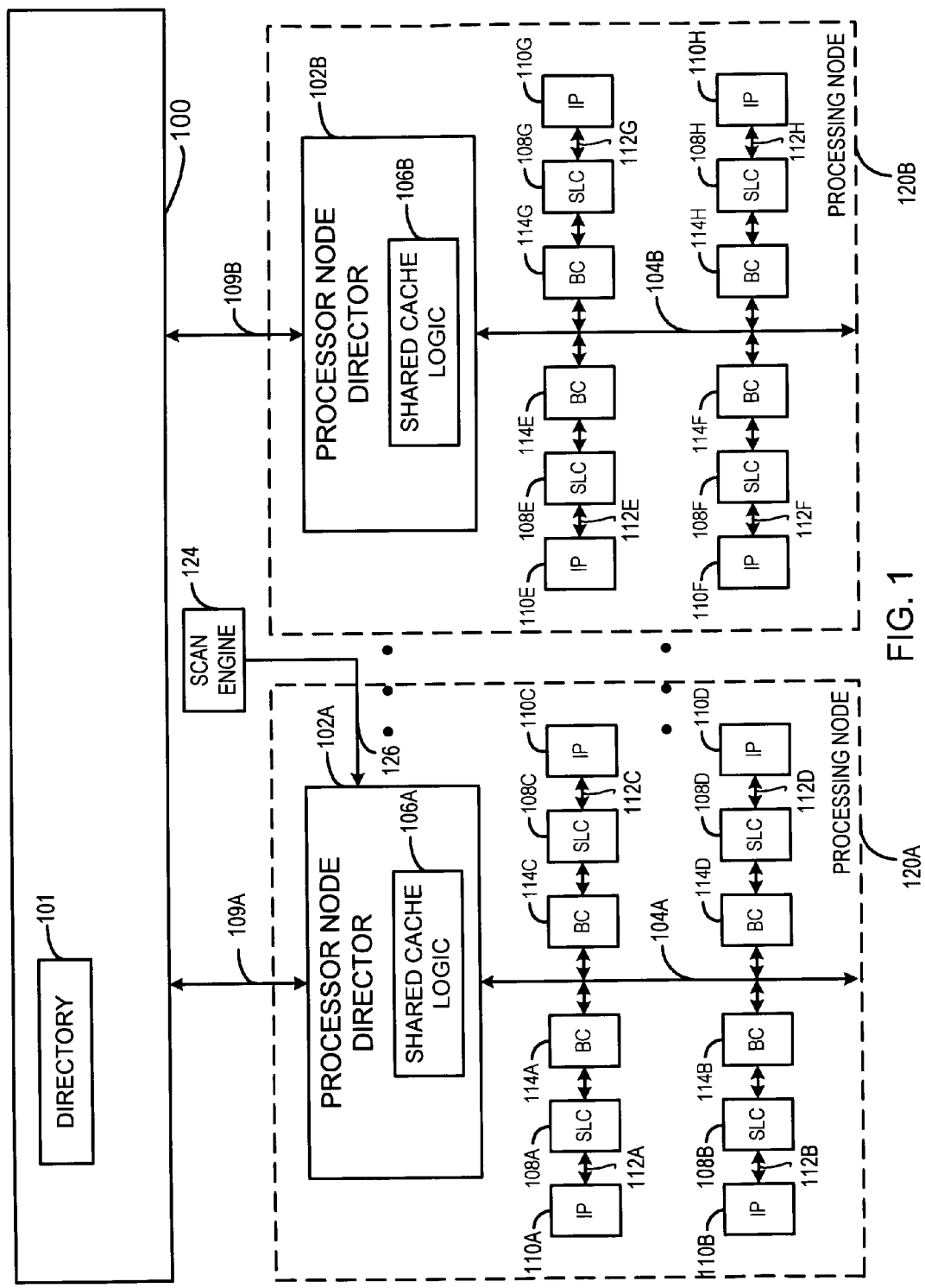
FIG. 1 is a block diagram of an exemplary data processing system of the type that may employ the current invention.

FIG. 1 is a block diagram of an exemplary data processing system that may employ the current invention. The system includes a Storage Coherency Director (SCD) 100 that provides the main memory facility for the system. SCD 100 may include random access memory (RAM), read-only memory (ROM), and any other type of memory known in the art. SCD 100 may be subdivided into multiple subunits (not shown) in a manner largely beyond the scope of the current invention. In one embodiment, SCD is a directory-based storage unit. In this embodiment, SCD retains information in directory 101 that indicates where the latest copy of requested data resides within the system. This is necessary since data from SCD 100 may be copied into any of the various cache memories within the system. Directory 101 tracks the latest copy of the data to ensure that every processor is operating from this copy. In the current embodiment, directory 101 includes a directory entry that tracks the location of each 128-byte block of memory within the SCD, where a 128-byte block is referred to as a cache line.

SCD is coupled to one or more Processor Node Directors (PND) shown as PNDs 102A and 102B. The system of the current invention may include more or fewer PNDs than are shown in FIG. 1. Each PND is coupled to SCD 100 over one or more high-speed SCD interfaces shown as 109A and 109B that each includes data, address, and function lines. For simplicity, each PND is shown coupled to SCD 100 over a single interface.

Each PND includes logic to interface to the high-speed SCD interface, and further includes logic to interface to a respective processor bus such as processor bus 104A or 104B. These processor buses can employ any type of bus protocol. Each PND may further include shared cache and all supporting logic, shown as shared cache logic 106A and 106B, respectively. This cache logic may include a Third-Level Cache (TLC), a Fourth-Level Cache (4LC), or some other type of cache memory.

As noted above, each of PNDs 102A and 102B is coupled to a respective processor bus 104A and 104B. Each processor bus further couples to multiple local cache memories through respective Bus Controllers (BCs). Each BC controls the transfer of data to and from the processor bus in a manner that conforms to bus protocol. In the current embodiment, Second-Level Caches (SLCs) 108A-108D are coupled to processor bus 104A through BCs 114A-114D, respectively. Similarly, SLCs 108E-108H are coupled to processor bus 104B through BCs 114E-114H, respectively. In another embodiment, these local caches may be Third-Level Caches.

Each SLC 108 is also coupled to a respective one of the Instruction Processors (IPs) 110A-110H over a respective interface 112A-112H. For example, SLC 108A is coupled to IP 110A via interface 112A, SLC 108B is coupled to IP 110B via interface 112B, and so on. An IP may be any type of processor such as a 2200™ processor commercially available from Unisys Corporation, a processor commercially available from Intel Corporation, or any other processor known in the art. Each IP may include one or more on-board caches. In the current embodiment, each IP includes a First-Level Cache (FLC). Preferably, each IP resides on a single Application Specific Integrated Circuit (ASIC) device with a respective SLC 108. Alternatively, an IP may be coupled to a respective SLC over an external interface. The associated BC may or may not be integrated with the SLC logic, and may also reside within the same ASIC.

A PND, its respective processor bus, and the entities coupled to the processor bus may be referred to as a "processing node". In the current example, PND 102A, processor bus 104A, and all entities associated with processor bus including BCs 114A-114D, SLCs 108A-108D, and IPs 110A-110D may be referred to as processing node 120A. Similarly, PND 102B, processor bus 104B, and all entities associated with processor bus 104B comprise a second processing node 120B. Other processing nodes may exist within the system.

The system of FIG. 1 may further include a scan engine 124 coupled to a scan interface 126. Scan interface 126 is shown coupled to PND 102A for simplicity, but it will be understood this scan interface would generally be coupled to many units within the system. In one embodiment, scan interface provides serial scan capabilities, as is known in the art. Scan engine is capable of performing read and write operations via scan interface 126 to various storage devices within the system before, or during, normal system operation. These read and write operations may be performed to initialize logic, diagnose and recover from error conditions, and change the setting of various mode switches, as will be discussed further below.

During execution, an IP is accessing programmed instructions and data from SCD 100 and its respective caches. For example, when IP 110A requires access to a memory address, it first attempts to retrieve this address from its internal cache(s) such as its FLC. If the requested address is not resident in the FLC, a request is sent to the respective SLC 108A. If the requested data is likewise not resident within the SLC, the SLC forwards the request to the processor bus 104A.

In one embodiment, all BCs on a processor bus implement a snoop protocol to monitor, or "snoop", the processor bus for requests. In the current example, BCs 114B-114D snoop the request initiated IP 110A and SLC 108A. The snooped request is transferred by each BC to its associated SLC to determine when the SLC has a modified copy of the requested cache line. If so, the updated data copy will be returned to requesting SLC 108A via processor bus 104A during a Processor Bus Write-Back (PBWB) operation. Additionally, SLCs 108B-108D may have to invalidate any stored copies of the data depending on the type of request made by SLC 108A. This is discussed further below.

PND 102A also snoops the request from SLC 108A. PND 102A determines whether shared cache logic 106A stores the most recent copy of the requested data. If so, the data will be provided by PND 102A to SLC 108A.

In some instances, data requested by IP 110A is not resident within any of the cache memories associated with processor bus 104A. In that case, PND 102A must forward the request to SCD 100. SCD 100 determines the location of the current copy of the requested data using information stored within its directory 101. The most current copy may reside within the SCD itself. If so, the SCD provides the data directly to PND 102A.

In some cases, requested data is stored within a cache memory of a different processing node. In this instance, the way in which the request is handled depends on the type of request made by IP 110A, and the type of access rights that have been acquired by the other processing node. If IP 110A is requesting "ownership" of the data so that a write operation can be performed, and further if another processing node 120 currently retains ownership of the data, the SCD issues a "port snoop and invalidate" request. This request will cause the processing node to invalidate any stored data copies, and return updated data to SCD 100 so that this updated copy may be forwarded to PND 102A.

In another situation, the IP 110A may be requesting ownership of data that is retained with read-only access rights by one or more other processing nodes 120. In this situation, an invalidation request is issued to these one or more processing nodes. An invalidation request causes a processing node to invalidate its copies of the data so that the data may no longer be used.

In still another scenario, IP 110A may be requesting read-only access to data that is retained with ownership privileges by another node. In this case, SCD 100 issues a "port snoop" request to the other processing node. The other node may relinquish all access rights when returning the data, or, in some instances, may retain a read-only copy. The determination of whether to retain a read-only copy is largely beyond the scope of the present invention.

In any of the foregoing scenarios, SCD 100 issues an appropriate request to one or more processing nodes 120. Each request is received by the PND of the processing node. In response to such a request, the PND may issue a request on the respective processor bus 104 to prompt return of any modified data. Based on the particular scenario, this request may also result in invalidation of the stored copy, or the conversion of that copy to read-only data. Any updated data will be returned to SCD 100.

As may be appreciated from the foregoing discussion, system performance can be significantly impacted by the data that is retained within the caches of the processing nodes. When an IP makes a request for data that is not stored within one of its dedicated caches or the shared cache, the processing node must initiate a request to SCD 100. In turn, the SCD may have to issue a request to one or more other processing nodes to obtain the data. Because this may be time-consuming, it is generally desirable to ensure that as many requests as possible can be satisfied by references to local caches. However, if multiple IPs are actively sharing data, it may be beneficial to ensure that updated data is not retained within a dedicated processor cache, but instead is flushed to the SCD where it can be readily available to the other IPs.

In prior art systems, the control over which data is retained within a particular cache is fixed based on architectural decisions made at design time. This does not provide a flexible approach that allows system operations to adapt to changing conditions. The current invention provides a system and method that allows the replacement of data within a cache to be programmably controlled, as will be discussed in reference to the remaining Figures.

Figure 2:
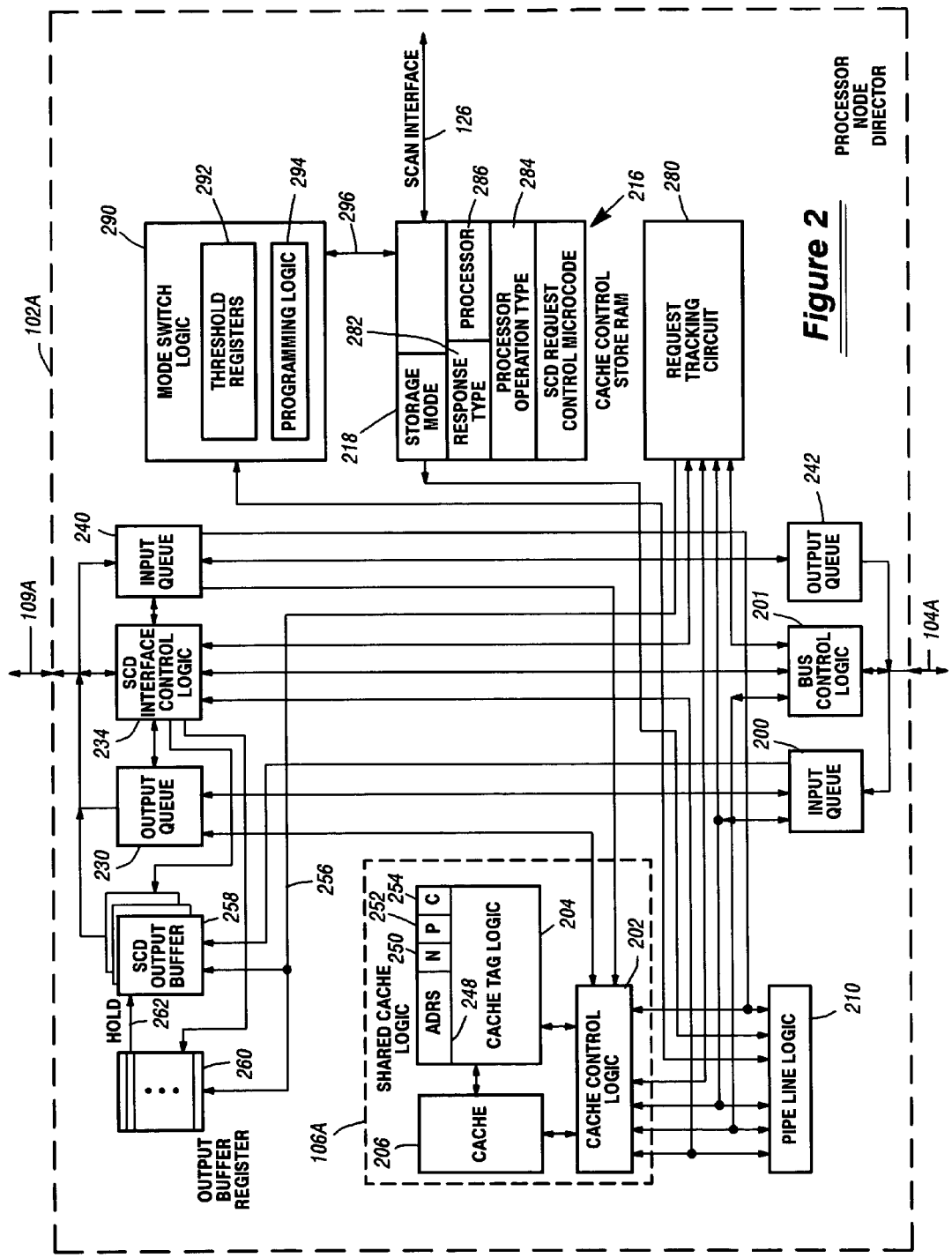
FIG. 2 is a block diagram of one embodiment of the current invention that is adapted for use within a data processing platform similar to that of FIG. 1.

FIG. 2 is a block diagram of logic within a PND 102 according to the current invention. Although PND 102A is shown and described, it will be understood that this discussion applies to any other PND as well. PND 102A includes shared cache logic 106A, which manages and stores data requested by the IPs residing on processor bus 104A. Shared cache logic 106A comprises a cache memory 206, and cache tag logic 204 to store tag information describing the data residing within cache memory, as is known in the art. Shared cache logic further includes cache control logic 202, which provides the control circuitry for referencing cache tag logic 204 and cache 206.

As mentioned above, cache tag logic 204 stores tag information for any data that is retained within processing node 120A. In the current example, cache control logic 202 will reference the tag information for the requested cache line, which includes a partial cache line address in address field 248.

The tag information further includes a node indicator "N" 250 that records the type of access rights that have been granted to the processing node for the data. Such access rights may include exclusive ownership, indicating that the processing node has the right to both read and update the data. The rights may instead be limited to read-only privileges. In another case, node indicator "N" may indicate that the data is invalid such that a valid copy of the data no longer resides within the processing node.

In addition to the node indicator 250, cache tag logic may further include a multi-bit processor bus indicator, "P", 252 that tracks the type of access rights retained by the various SLCs and FLCs coupled to processor bus 104A. For example, if the data has been provided with ownership to one of the SLCs on processor bus 104A, the processor bus is said to have exclusive ownership of the data. This means the most up-to-date copy of the data does not necessarily reside within cache 206, but instead may reside within one of the SLCs 108. In another instance, indicator 252 indicates that processor bus 104A is guaranteed to have a modified copy of the data as compared to the copy stored within cache 206. In yet other cases, the indicator may record that processor bus 104A retains a read-only copy of the data such that one or more of the SLCs store the data with read-only privileges. Finally, the processor bus indicator may record that none of the SLCs retains a copy of the data, and the only valid copy is retained within cache 206.

In one embodiment, cache tag logic further includes a multi-bit cache indicator, "C", 254 to record the state of the data within cache 206. For example, the data may be designated as having been modified, meaning an updated copy of the data is stored within cache 206. In contrast, it could be listed as residing within cache in the unmodified state. It may further be indicated as "not present", meaning the only copy of the data within processing node 120A resides within one of the SLCs 108 and the associated IP. In still another embodiment, this indicator may indicate that cache 206 is not available for use. In this embodiment, the data processing system of FIG. 1 does not utilize shared cache logic 106A, and any requests received by a PND 102 from a processor bus 104 are forwarded directly to SCD 100 for processing.

Shared cache logic 106A is coupled to pipeline logic 210, which is a logic sequencer for scheduling and handling requests received from processor bus 104A, or from SCD 100 on interface 109A. Pipeline control logic provides the control signals that cause cache control logic 202 to initiate references to cache 206.

Pipeline control logic operates under the control of programmable control signals stored within cache control store RAM 216. Any other type of read/write storage device may be used in the alternative to implement this control store. The programmable control signals that are stored within cache control store RAM include a storage mode indicator 218. This indicator may be programmed using scan engine 124 and scan interface 126, as will be described further below.

Requests for data are received from SCD 100 on interface 109A. These requests are stored within input queue 240 prior to being processed under the control of pipeline logic 210. When a request enters pipeline logic 210, the request may prompt pipeline logic 210 to issue a request for the data to processor bus 104A via output queue and bus control logic 201.

Any data returned on the processor bus 104A as a result of the request may be stored within input queue 200. If pipeline logic 210 initiates a cache replacement operation, this data may be stored to shared cache logic 106A under the control of cache control logic 202. This data may also be transferred to output queue 230 to be returned to SCD 100 via interface 109A. This occurs under the control of SCD interface control logic 234. In still another situation, data that is returned on processor bus 104A cannot be stored to shared cache logic 106A because cache 206 is full. In this situation, the data must be transferred from input queue 200 to an available one of SCD output buffers 258 for temporarily storage. This data is retained in the output buffer under the control of whichever one of output buffer registers 260 corresponds to the buffer that retains the data. This will be discussed further below.

PND 102A further includes a request tracking circuit 280. This logic is used to track requests that are issued by the PND 280 to SCD 100. In particular, when PND 102A makes a request to read or write data to SCD 100, an entry is created within request tracking circuit. This entry will match each request that is issued to the SCD with a response from the SCD. This match is performed using a transaction identifier that is transmitted with the request, and returned with the associated response.

In addition to tracking requests and responses in the foregoing manner, request tracking circuit 280 is further employed to ensure that memory coherency is maintained within the system. As discussed above, maintaining memory coherency involves ensuring that each processor in the system is working from the same, most-recent copy of any data. Further, if a processor updates a first, then a second, portion of the memory, these updates must become visible to other IPs within the system in that same order.

Some types of storage operations may result in situations that could cause memory coherency problems. For example, assume that SCD 100 provides data to processing node 120A for update purposes before read-only copies of that data that are retained by other processing nodes have been invalidated. This may be done to increase system throughput by allowing processing node 120A to commence processing activities in an expedited manner. At approximately the time the data is provided to processing node 120A, the SCD also issues one or more requests to other processing nodes to invalidate the read-only copies that are retained by these other nodes.

Next, assume that processing node 120A updates portions of the data and sets a flag to indicate that this updated data is ready for use by the other processing nodes. Processing node 120A then stores the updated data and flag back to SCD 100. The other processing nodes read the flag indicating the updated data is available for use. However, if these other processing nodes have not yet processed the invalidate requests from the SCD, these processing nodes may utilize the old copies of the data rather than the updated data copy. Memory incoherency will result.

To prevent the type of situation described above, a processing node that receives data for update purposes before all read-only copies have been invalidated cannot return an updated copy of that data to the SCD before pending invalidation operations have been completed for this, and for certain associated, data. This associated data includes data that was requested from SCD 100 by any processor within the processing node that may have accessed the received data. This associated data is limited to that data retained by the processing node for which invalidation operations remain pending at the time the received data is stored within cache 206 or one of the SCD output buffers 258 for potential transfer to the SCD 100. This is largely beyond the scope of the current invention, and is described in detail in commonly-assigned patent application Ser. No. 10/600,205 entitled "Data Acceleration Mechanism for a Multiprocessor Shared Memory System", filed on Jun. 20, 2003, which is incorporated by reference in its entirety.

For purposes of the current invention, it is sufficient to note that when data is provided to a processing node by the SCD, an indication is also provided if any invalidation operations are pending for the data. When these invalidation operations are completed, SCD sends a corresponding acknowledgement. Each processing node includes a request tracking circuit 280 that tracks all pending invalidation operations, as well as the associated acknowledgements, for that node. In addition, when any data that is associated with outstanding invalidation operations is modified and then stored to cache 206, request tracking circuit 280 creates an entry to record that this data is associated with a "coherency conflict". Coherency conflicts are not cleared until the associated outstanding coherency operations are completed, as signed by the associated acknowledgements received from the SCD. This tracking mechanism is used by pipeline logic 210 to ensure that updated data is not returned by SCD 100 until all appropriate invalidation operations that may affect memory coherency have been completed.

Logic included within PND 102A may be implemented using one or more ASICs. For example, in one embodiment, cache 206 is implemented in a separate ASIC to allow for a memory of sufficient size. Another ASIC is used to implement the remainder of the PND logic. This provides a modular system that allows caches of various sizes to be selected for use within the system in a plug-and-play manner. In one embodiment of the system, cache 206 may be omitted entirely such that all memory requests provided on processor bus 104A are forwarded to SCD 100. In this embodiment, state bits stored within cache tag logic 204 indicate that cache 206 is not available for use. This will be discussed further below.

With the foregoing overview of the system of FIG. 2 available for discussion purposes, a more detailed description of the operation of the invention is now considered. As discussed above, As discussed above, cache control store RAM 216 stores a multi-bit store mode indicator 218. This multi-bit field controls the manner in which pipeline logic 210 and cache control logic 202 store data to cache 206. In one embodiment, this storage mode field is used to select between several modes of operation, as follows.

Default Replacement Mode

In one embodiment, the default mode may be referred to as a default replacement mode. In this mode, all data received from SCD 100 as the result of a request issued by any of the IPs 110 and associated SLCs 108 within processing node 120A is replaced within cache 206.

When operating in this mode, a request is issued to SCD via interface 109A. Request tracking circuit 280 stores an indication recording the type of request, as well as the identity of the requester that initiated the request. After data is returned from SCD on interface 109A as a response to the request, it is stored temporarily in input queue 240. The request enters pipeline logic, which then determines the identity of the requester and request type from the request information stored by request tracking circuit 280. The data is provided from input queue 240 to output queue 242, and bus control logic 201 issues a response with the data to the appropriate requester on processor bus 104A.

Sometime after the data is provided to processor bus 104A, pipeline logic 210 prompts cache control logic 202 to initiate a reference to cache tag logic 204. In one embodiment, cache 206 is a four-way set associative cache. Each of the four blocks in a set stores a cache line of data. A least-recently used algorithm is employed to determine which of the four blocks within a set will be replaced. Cache tag logic 204 stores an encoded value for each of the four blocks indicating whether a particular block is either the oldest, or the newest, block in the set. This encoded value is updated each time a cache line is stored to a block of a set.

When data is stored to cache 206, it will be stored to an unused block of a set if such a block exists. Otherwise, a cache replacement operation is scheduled as follows. Using the tag information described above, cache control logic 202 determines which of the blocks in the target cache set is the oldest block. In most cases, the cache line stored within this oldest block may be transferred to output queue 230 and forwarded to SCD. The newly received data can then be replaced within cache 206, and the tag information associated with this block can be updated. In some special cases, the oldest cache block cannot be transferred back to the SCD in the foregoing manner. This occurs when the oldest block stores data that is associated with a coherency conflict. Recall that this type of conflict indicates that certain coherency operations have not been completed for that, or for associated data that is retained by the processing node. Such coherency conflicts are tracked by request tracking circuit 280. In one embodiment, if the oldest block is associated with a coherency conflict, a replacement operation is not performed. This is allowable, since in this embodiment, cache 206 is non-inclusive. In this case, a subsequent reference to cache 206 for the recently returned cache line will result in a cache miss.

In an alternative embodiment, if the oldest block is associated with a coherency conflict such that this block cannot be replaced, one of the other blocks in the set could be checked for conflicts. For example, one or both of the blocks that are not designated as the newest block could be checked for conflicts. If either of these blocks is not associated with a conflict, that block could be stored to SCD 100 so that the newly acquired data could be replaced within the cache.

As described above, when PND 102A is operating in default replacement mode, data returned from SCD 100 is stored within the shared cache unless coherency conflicts prevent this replacement from occurring. In a similar manner, other types of data are likewise stored to cache when operating in this mode. For example, all updated data that is returned on processor bus 104A during a PBWB operation will be stored to cache 206 unless coherency conflicts prevent this from occurring.

As discussed above, a PBWB operation occurs when one of the IPs initiates a request for data to processor bus 104A via its respective SLC 108 and BC 114. All BCs 114 on a processor bus implement a snoop protocol to monitor, or "snoop", the processor bus for such requests. When the request is snooped by the BCs on the processor bus, each BC forwards the request to its associated SLC. Each SLC determines whether it stores an updated copy of the data. If an SLC does have a modified copy of the requested cache line, it will be returned to the requesting IP via processor bus 104A during a PBWB operation. Additionally, the SLC and/or IP that previously retained the data may have to invalidate any stored copies depending on the type of request issued for the data. For example, if the request is soliciting ownership of the data for update purposes, any copies of the data must be invalidated. Otherwise, if read-only access is requested, any SLC returning the updated data copy may optionally retain a read-only copy of the data. When a PBWB operation occurs, any updated copy of the data that is driven onto the processor bus is transferred to input queue 200. Pipeline logic 210 causes cache control logic 202 to initiate a reference to cache tag logic 204. If a cache hit occurs, the updated copy of the data is stored to cache and the tag information is updated as needed. If a cache miss occurs, a cache replacement operation is scheduled for this data such that the oldest block of the cache set is evicted, and the current data is stored in its place.

In some cases, it may not be possible to complete the replacement operation. This may occur because the oldest block within the target cache set is associated with conflicts in the manner discussed above. In one embodiment, when this occurs, request tracking circuit 280 is referenced to determine whether a conflict occurs for the data returned during the PBWB operation. If not, this data may be transferred to output queue 230, and returned to SCD 100. If the data is associated with a conflict, however, the data provided during the PBWB operation is transferred from input queue 200 to an available one of the SCD output buffers 258. In addition, request tracking circuit 280 stores control bits in a corresponding one of output buffer registers 260. These control bits reflect the coherency conflicts that currently exist for the data. As long as these coherency conflicts exist, a hold signal is asserted on line 262 to prevent the data stored within SCD output buffers from being transferred to SCD 100.

Eventually, one or more responses will be received from SCD 100 indicating that the coherency conflicts have been resolved. Request tracking circuit will clear the control bits stored within the corresponding one of output buffer registers 260, thereby allowing the data stored within one of the SCD output buffers 258 to be transferred to SCD 100.

The foregoing describes the handling of data that is returned to PND 102A on processor bus 104A during a PBWB operation. Data may also be provided to PND on processor bus 104A during a second type of operation known merely as a Write-Back (WB) operation. During this type of operation, data that was retained by one of the SLCs is provided to PND 102A via processor bus 104A because the data is no longer needed by the respective IP. This data is transferred into input queue 200, and pipeline logic 210 causes cache control logic 202 to initiate a reference to cache tag logic 204. If a cache hit occurs, the returned data is stored to cache 206. Otherwise, if a cache miss occurs, a replacement operation is not scheduled. Instead, pipeline logic 210 initiates a reference to request tracking circuit 280 to determine whether a conflict exists for this data. If not, the data is transferred to output queue 230, and is forwarded to SCD 100. If a conflict does exist, this data is stored temporarily in an available one of SCD output buffers 258 in the manner discussed above. When the associated conflict clears, the data may then be provided to SCD 100.

As discussed above, default replacement mode stores data that is returned from SCD 100 into cache 206 unless the replacement operation is prevented by existing conflicts. Further, data returned to PND 102A during a PBWB operation is likewise stored in cache unless conflicts exist to prevent this replacement operation. A cache replacement is performed in this type of situation because a PBWB operation involves the transfer of data between multiple IPs within the processing node. Since multiple IPs within the node are using the data, it is considered beneficial to retain the data within cache 206.

In contrast to the PBWB scenario, data returned to PND 102A during a WB operation is not replaced in cache unless a cache hit occurs. In this case, the IP previously retaining the data is evicting that data from its dedicated caches. This may be considered a likely indication that the data will no longer be needed within the processing node.

Selective Replacement Mode

In one embodiment of the invention, a selective replacement mode is provided in addition to, or instead of, the default replacement mode discussed above. In selective replacement mode, data is replaced within cache in a manner that is similar to that discussed above with respect to replacement mode. However, in this embodiment of the invention, not all data returned from SCD 100 is replaced within cache 206 as follows.

In an embodiment employing selective replacement mode, some or all of the IPs within a processing node are capable of initiating a special type of ownership request. This ownership request indicates that the requesting IP is guaranteeing to modify the requested data. This request type may be indicated on processor bus 104A using a dedicated processor bus signal, or by providing an encoded value on multiple signal lines of the bus.

Assuming that this request results in a miss to processor bus 104A such that none of the SLCs 108 within the processing node stores the requested data, and further assuming a cache miss occurs to cache 206, this request will be forwarded to SCD 100. At this time, the identity of the requester as well as the request type is recorded by request tracking logic 280.

When data is returned from SCD 100, PND forwards this returned data to the requester via processor bus 104A in the manner discussed above. However, because this data was returned in response to a request that is of a type indicating that the data is guaranteed to be modified by the requester, pipeline logic 210 schedules a special type of replacement operation. During this replacement operation, address field 248 of the tag information is updated to record the cache line address. The "N" indicator 250 is updated to indicate the processing node has ownership of the data, and the "P" indicator 252 is set to indicate that the IP that retains the data will be updating that data. The "C" indicator 254 is set to indicate that the data is not retained within cache 206.

After cache control logic 202 completes the update to the tag information, the replacement operation is considered complete. The data received from SCD 100 is not stored within cache 206 since that data is guaranteed to be modified by the IP that received the data. Because the data store operation is not performed, the cache reference completes more quickly. This increases the bandwidth of the cache, allowing more cache requests to be processed within a given period of time.

Sometime after the tag information is updated for the data, the IP and associated SLC that received the data may initiate a WB operation to PND 102A. The data is stored within input queue 200, and pipeline logic 210 initiates a cache reference. The "P" indicator 252 indicates this data is associated with a tag entry, but has not been replaced within cache 206. Therefore, this data will be replaced in the cache at this time. Other WB operations are handled in the manner discussed above. That is, if a cache hit occurs, the data is stored to cache 206. Otherwise, the data is returned to SCD 100 without initiating a replacement operation.

In addition to WB operations, PBWB operations may be performed in the manner discussed above. Recall that this involves providing a copy of updated data on processor bus 104A in response to a snooped request that was initiated by another IP on the bus. While operating in selective replacement mode, updated data that is provided on processor bus in this manner will be stored within input queue 200 of PND 102A. In response to receipt of this data, pipeline logic 210 will prompt cache control logic 202 to reference cache tag logic 204. As discussed above in regards to default replacement mode, if a cache hit occurs, the data is stored to cache 206 and the tags are updated. If a cache miss occurs, a replacement operation will be scheduled assuming conflicts do not prevent this replacement operation from completing. If request tracking circuit 280 determines that a replacement operation cannot be performed because of conflicts, the data returned during the PBWB operation will be returned to SCD 100. In the manner discussed above, this data will be returned at that time, or if necessary, after conflicts associated with the data have cleared.

Comprehensive Replacement Mode

In one embodiment of the invention, a comprehensive replacement mode is also provided. This mode may be provided in addition to, or instead of, one or more of the modes discussed above. In comprehensive replacement mode, data is replaced within cache in a manner that is similar to that discussed above with respect to default replacement mode. However, in this mode, data returned during a WB operation will be stored to cache 206 regardless of whether a cache miss occurs. That is, if a cache hit occurs, the data is stored to cache. Similarly, if a cache miss occurs, a replacement operation is scheduled to evict the oldest cache line in the set and store the new data to cache 206. If the replacement operation is prevented by the detection of a conflict on the oldest cache line, the data returned during the WB operation is provided to the SCD 100.

Store-Through Mode

In one embodiment, storage mode indicator 218 may select a store-through mode. In this mode, when data is returned from SCD 100 as the result of an ownership request indicating that the data is guaranteed to be modified by the requesting IP 110, the data is provided to the requester via processor bus 104A in the manner discussed above. However, in this case, pipeline logic 210 does not initiate the updating of the tag information within cache tag logic 204, or the storing of this data to cache 206. When an updated copy of this data is later provided to PND 102A by one of the SLCs 108 on processor bus because of a WB operation, a miss to cache tag logic 204 will occur. Because the cache is operating in store-through mode, the updated data copy will be transferred from input queue 200 to output queue 230, and will be transferred back to SCD 100 under the control of SCD interface control logic 234. If an updated copy of data is provided as a result of a PBWB operation, the data will be stored to cache 206. If a replacement operation is not possible because of conflicts existing on the oldest cache block, the updated copy is transferred to SCD 100.

Store-through mode may be beneficially employed when the IPs of multiple processing nodes are operating on shared data. In this case, when an IP has completed updates to that data, those updates are transferred to the SCD so that they may be more quickly obtained by one or more IPs within another processing node.

Cache-Not-Present Mode

In yet another mode of operation, storage mode indicator 218 indicates that cache 206 is not available for use. This may occur either because the cache has been degraded following the occurrence of non-recoverable faults, or because the cache is not available at all. For example, in a modular system wherein cache 206 is implemented in a different ASIC as compared to the other PND logic, some customers may select a system that does not include cache 206. In this instance, the cache not present mode is utilized. In this mode, all data that is requested on processor bus 104A must be obtained from SCD 100. When requested data is returned from the SCD, it is provided to the requester via processor bus 104A, but is not stored within cache 206. Any data returned to PND 102A as the result of a PBWB or a WB operation must be returned to the SCD.

The above-described modes are merely exemplary. It will be understood that other modes may be readily defined. For example, in yet another possible mode, data returned to PND 102A during a WB operation may be replaced in cache if a cache miss occurs, whereas data returned during a PBWB operation will not be replaced in cache if a miss occurs. Therefore, the modes described above are merely exemplary, and are mentioned because they are considered particularly useful within the context of the system of FIG. 1.

In one alternative embodiment, reference mode indicator 218 may be replaced by one or more fields that represent various types of system scenarios that may arise. For example, a response field 282 may be provided to represent the various types of responses that may be provided by SCD 100 when data is returned. For example, these types of responses may include data returned with read-only privileges, data returned with write privileges, data returned with write privileges as a result of an ownership request, and so on. Response field 282 is set to a value that indicates which type of responses will result in the replacement of returned data to cache 206. In one embodiment, response field 282 is a master-bitted value, with a bit provided for each response type. A bit is set to a value indicative of whether data should be replaced within cache 206 when the corresponding response type occurs.

In this embodiment, a second processor operation type field 284 may be provided. In a manner similar to that described above in reference to response field 282, field 284 may be used to represent the various types of bus operations that occur on processor bus 104A when data is provided to PND 102A. For example, these processor operation types may include PBWB or WB operations. Other types of operations are possible within the scope of the invention based on the types of functions supported by processor bus 104A and IPs 110. Processor operation type field 284 is set to a value that indicates the type of bus operations that will result in a cache replacement operation if a cache miss occurs after updated data is returned to PND 102A. In one embodiment, field 284 is a master-bitted field, with each bit in the vector corresponding to a operation type. A bit is set to a value indicative of whether data should be replaced within cache when the corresponding operation type occurs. This alternative embodiment allows a user to selectively activate the type of storage operations that are considered applicable for a given data processing configuration.

According to another aspect of the invention, a processor field 286 may be provided to identify the various IPs within a processing node. This field may be used to further control the types of data stored to cache. For example, field 286 may include a sub-field for each IP in the processing node. This sub-field may be set to a predetermined state to allow data provided by a corresponding IP 110, SLC 108, and BC 114 on processor bus 104A to be replaced in cache 206 if a miss occurs. This sub-field may also be used to enable data that must be requested from SCD 100 following a request issued by the corresponding IP to be replaced in cache 206 after it is provided on interface 109A.

In still another embodiment, processor field 286 may be used in conjunction with either storage mode indicator 218, or one or both of the request type field 282 and processor operation type field 284. For example, these fields could be used in conjunction to dictate that data is replaced within cache for an enabled IP only for the request and operation types that are enabled in the request type and processor operation type fields, respectively. Other combinations are, of course, possible. For example, respective response and processor operation type fields may be provided for each of the IPs in a processing node to even further control the storing of data to cache 206. In addition, fields similar to fields 282-286 may be provided to control which data is recorded by cache tag logic 204 but not stored within cache. This is similar to the way in which data returned in response to ownership requests is tracked by the cache tag logic 204, but is not stored within cache 206.

As may be appreciated from the above discussion, the way in which data is handled by shared cache logic 106A depends on many factors, including the storage mode setting indicated by storage mode indicator 218, and the state of the tag indicators 250, 252, and 254. In one embodiment, the control sequences that cause pipeline logic 210 and cache control logic 202 to initiate the appropriate types of operations to cache tag logic 204 and cache 206 are encoded in programmable microcode bits stored within cache control store RAM 216 rather than being embodied in hardware. For example, these bits, which are shown as SCD request control microcode, are used in conjunction with one or more of the fields 218 and/or 282-286 to control when, and which type, of reference will be initiated to shared cache logic 106A in any given situation. This provides system flexibility by allowing the cache management mechanism to be programmably modified.

Mode Selection

According to one embodiment described above, data is stored to shared cache logic 106A using alternative storage modes selected using storage mode indicator 218. The mode of operation for this indicator may be selectable based on user requirements. For example, cost-savings may be obtained by purchasing a configuration that does not include cache 206. In this case, the system is configured to run in cache-not-present mode. This mode may also be selected following the occurrence of faults.

When selecting between one of the replacement modes, several factors may be considered. For example, if one or more software applications that are being executed by a processing node require sharing of data between the IPs within that node, it may be desirable to run in comprehensive replacement mode. This ensures that data stored back to PND 102A during a WB operation will be retained within the processing node. On the other hand, if multiple IPs within different processing nodes are sharing data, one of either default mode replacement mode, selective replacement mode, or store-through mode may be beneficially employed. Of these three modes, store-through mode will provide the most control over data that is requested by an IP 110 using an ownership-type request. In this case, this data will not be cached at all within cache 206, and any data updates will be stored directly to SCD for use by other processing nodes.

Another consideration involves the relative number of updates being performed by the IPs of a processing node on data that is most likely not present within cache 206. If the software applications being executed by one or more IPs of a processing node are performing a relatively large percentage of data updates on data received from SCD 100, it may be beneficial to run in selective replacement mode, since this mode increases the throughput of cache 206.

The state of storage mode indicator 218 can be set to optimize performance based on system parameters. For example, as the size of cache 206 increases, it may become more advantageous to operate in comprehensive replacement mode. Conversely, as the cache size decreases, either default replacement mode, selective replacement mode, or store-through mode may be more beneficially employed. As discussed above, in a system that does not include cache 206, cache-not-present mode is utilized.

In one embodiment of the invention, storage mode indicator 218 may be programmed by scan engine 124 via scan-set interface 126. This scan interface may be used to perform serial scan operations as is known in the art. According to one aspect of the invention, the state of the storage mode indicator 218 may be modified dynamically without stopping clocks to PND 102A, or without halting normal operations. The reference mode may be selected at system initialization, and may be modified any time thereafter.

The storage mode may be altered as system parameters dictate. For example, in one embodiment of the invention, the system of FIG. 1 is modular. Various models of IPs 110, SLCs 108, BCs 114, PNDs 102, and SCDs may be interchanged within the system in a plug-and-play manner. Therefore, depending on the various cache sizes and other components within a particular processing node, the storage mode of a particular PND 102 may be selected to optimize throughput for that node. In this manner, all PNDs within the system need not be programmed to the same reference mode.

According to one aspect of the invention, storage mode indicator 218 may be set by a scan operation initiated by the operating system. The mode selection may be made based on the applications that are running on the various IPs at a given time. In one embodiment, each software application that may be executed by the system may be assigned one or more ratings that indicate whether, and to what extent, the software application requires the sharing of data between the IPs of the same, and of different, processing nodes. A rating may likewise be assigned to indicate the approximate number of first-time references to a particular memory address that will result in data updates. This rating may be used, for example, to determine whether it is beneficial to operate in selective replacement mode. The OS utilizes the rating of all applications being executed by the various IPs within the same processing node to determine an overall rating indicative of the mix of operations occurring on the processor bus of that node. This overall rating may then be used to determine the appropriate state for storage mode indicator 218.

In another embodiment, pipeline logic 210 is coupled to mode switch logic 290. Mode switch logic 290 may be selectably enabled via scan-set interface 126. According to one aspect of the invention, mode switch logic 290 tracks data that is transferred back to SCD 100 as the result of WB operations that result in cache misses. In particular, when the system is operating in selective or default replacement mode, mode switch logic tracks a predetermined number of cache lines that were most recently stored back to the SCD because of a WB operation that resulted in a cache miss. If a cache line that is being tracked is re-requested by an IP within the processing node such that a request must be issued to the SCD, a count is incremented. If the count reaches a predetermined threshold value in a predetermined period of time, the mode is automatically switched to comprehensive mode, wherein the WB data will be cached when a cache miss occurs. The mode switch re-selection is controlled by programming logic 294 of mode switch logic, which re-selects the value of storage mode indicator 218 via interface 296.

Conversely, when operating in comprehensive replacement mode, a predetermined number of cache lines most recently stored to cache 206 during WB operations may be tracked. If any of the tracked cache lines are requested by an IP within the processing node, a count is incremented. If the count remains below a predetermined threshold value during a predetermined period of time, the mode may be automatically switched to a different mode that may be programmably selected. In general, default replacement, selective replacement, or store-through mode would be beneficially selected in this instance.

In one embodiment, mode switch logic tracks ownership requests on processor bus 104A. If, within a predetermined period of time, a predetermined number of such requests result in processor bus and cache miss situations such that requests must be issued to the SCD to retrieve the data, the mode may be switched to either selective replacement or store-through mode so that cache bandwidth may be effectively increased. The decision as to which of these modes to select may be programmable, and may be selected based on the software applications that are executing within the system at the time, as discussed above.

According to another aspect of the invention, cache faults may be tracked. For example, if a parity error occurs during a cache reference, a count may be incremented within mode switch logic. If a predetermined number of cache errors occurs during a predetermined period of time, the cache may be degraded such that the mode is automatically switched to cache-not-present mode. Some type of recovery mechanism must then be initiated to resume execution in a different mode that utilizes the cache.

In any of the foregoing cases, the threshold values used to trigger the mode switch may be programmable using programmable threshold registers 292 that can be set via scan-set interface 126.

Using the above-described programmable cache logic, references to shared cache may be programmably controlled to maximize system throughput. The control may be automated, as provided by mode switch logic 290. This control may be based on hardware and system parameters such as the types, sizes, and speeds of various caches. The control may further be based on workload characteristics, including the type of software applications that are being executed by the processors within the various processing nodes of the system. The control may further be based on the cache error rate.

Figure 3:
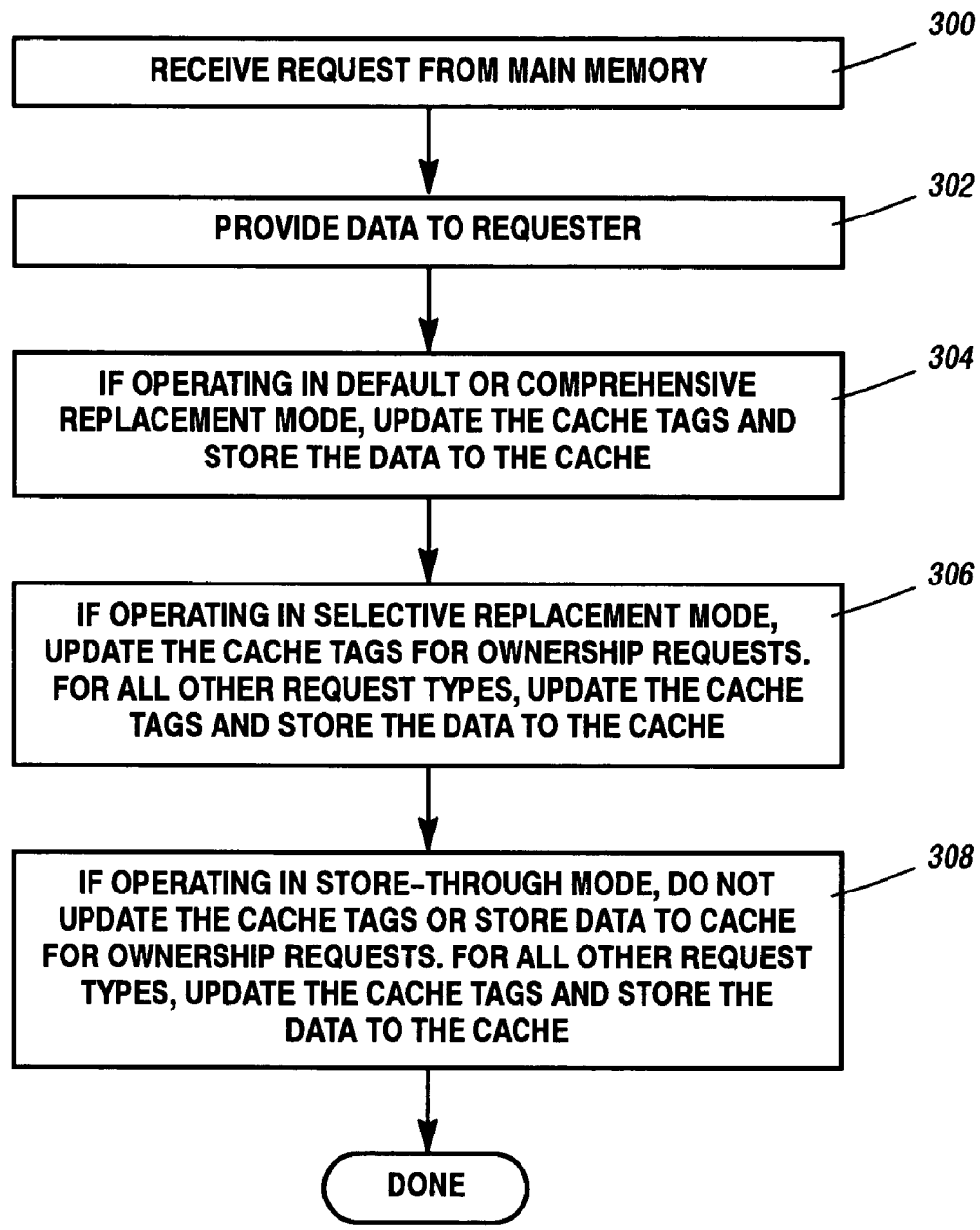
FIG. 3 is a flow diagram illustrating one method of using the storage mode indicator to manage data received by a cache from a main memory.

FIG. 3 is a flow diagram illustrating one method of using storage mode indicator 218 to manage data received by a cache from a main memory. In the current embodiment, the main memory resides within SCD 100. First, the data is received from the main memory (300) and is provided to a requester, which in the current embodiment, is one of the IPs in the processing node (302).

Next, if the system is operating in default or comprehensive replacement mode, the cache tags are updated and the data is stored to cache (304). In one embodiment of the system, data will not be stored in this manner if data that is to be replaced is associated with a conflict. This is allowable if the cache is a non-inclusive cache.

If the system is operating in selective replacement mode, processing will depend on the type of request that resulted in return of the data. For an ownership request indicating that the returned data will be updated by the requesting IP, the cache tags are updated to record that the data is retained by the processing node. However, the data is not stored to the cache. If the data was returned as the result of any other type of request, the cache tags are updated and the data is stored to cache (306). In one embodiment, the replacement operation may be prevented by the detection of conflicts.

As is the case when operating in selective replacement mode, if the system is operating in store-through mode, the processing of data will depend on the type of request that prompted return of the data. If the request is for ownership, no reference to cache is initiated. The tags are not updated, and the data is not stored within the cache. For all other types of requests, the cache tags are updated and the data is stored to cache (308). In one embodiment, the replacement operation may be prevented by the detection of conflicts.

The system may also be operating in cache-not-present mode. In this case, after data is provided to the requester, no additional actions need be taken.

Figure 4:
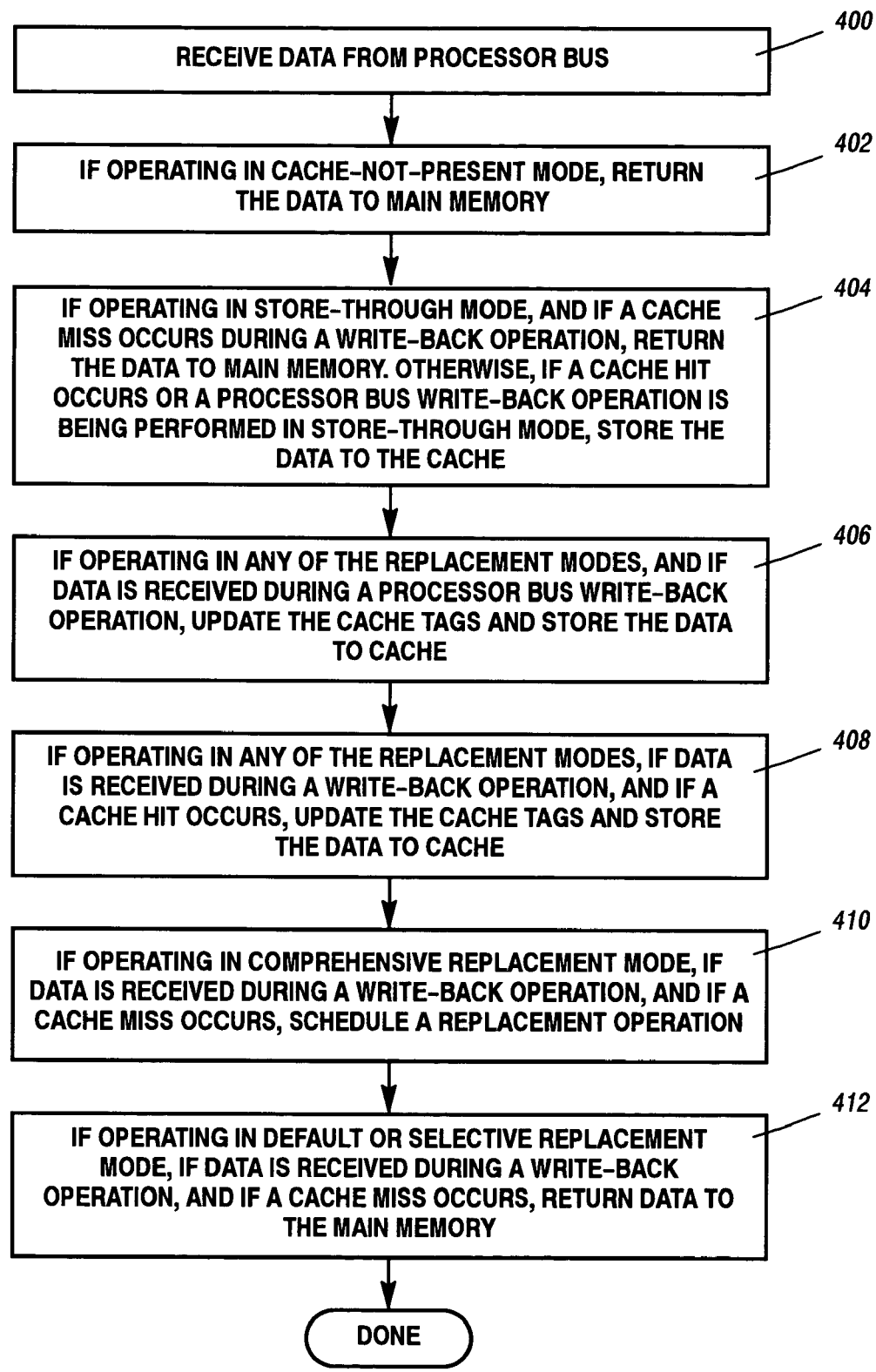
FIG. 4 is a flow diagram of one method of using the storage mode indicator to manage data received by a cache from a processor.

FIG. 4 is a flow diagram of one method of using the storage mode indicator of the current invention to manage data received by a cache from a processor. Data is first received from the processor (400). In the current embodiment, this data is provided via processor bus 104A. However, in alternative embodiments, the data could be obtained over a different type of communication interface.

If the storage mode indicator is set to cache-not-present mode, indicating the cache is either not present, or has been degraded, the data is returned to the main memory (402). In the embodiment of FIG. 1, this involves transferring the data to SCD 100. If operating in store-through mode, the cache tags are referenced. If a cache miss occurs during a WB operation, the data is returned to main memory. Recall that this type of miss situation will occur for data that is requested as a result of an ownership request, since in store-through mode, this type of data is not stored in the cache. If, however, a cache hit occurs, or a processor bus write-back operation is returning updated data, the data is stored to the cache (404).

If the system is operating in any of the replacement modes, and if the data is received during a PBWB operation, the cache tags are updated and the data is stored to the cache (406). Similarly, if the system is operating in any of the replacement modes, if the data is received during a WB operation, and is a cache hit occurs, the cache tags are updated and data is stored to cache (408). This situation encompasses the scenario wherein PND 102A is operating in selective replacement mode, and a WB operation is performed for data that is associated with a tag, but no data, entry. A cache hit will occur, the tags will be updated, and the data will be stored to cache.

In another scenario, the system is operating in one of the replacement modes, data is received during a WB operation, and a cache miss occurs. In this situation, the processing actions will depend on the mode of operation. In comprehensive replacement mode, a replacement operation will be scheduled so that the data is stored to cache (410). In contrast, in default or selective replacement modes, the data will be returned to main memory (412).

While FIGS. 3 and 4 provide one method of using storage mode indicator 218, similar methods are available for using values stored within one or more of fields 282-286 to control replacement of data within cache 206. In another embodiment, one or more of these values may be used to control whether cache tag logic 204 is updated to track data that is retrieved from SCD 100 but which is not stored to cache.

Figure 5:
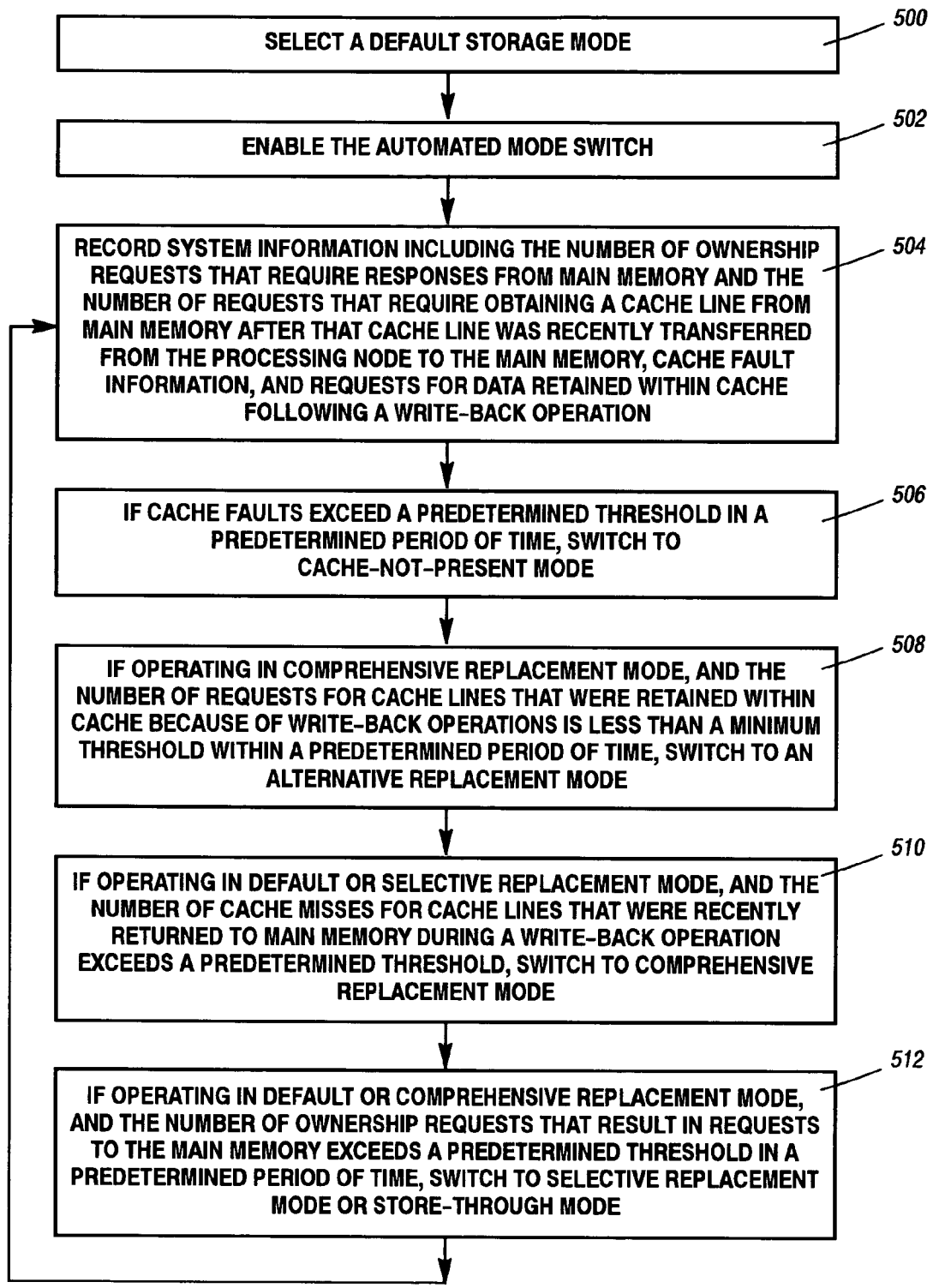
FIG. 5 is a flow diagram illustrating a method of selecting a storage mode setting according to the current invention.

FIG. 5 is a flow diagram illustrating an exemplary method of selecting a storage mode according to the current invention. First, a default storage mode is selected (500), which may include any of the modes discussed above, or a different mode that is defined by the user using a master-bitted version of the storage mode indicator, as discussed above. Next, the automated mode switch logic 290 is enabled (502). Mode switch logic records information that will be used to select another storage mode (504). For example, this information may include the number of ownership requests that requires responses from main memory. This may be useful, for example, in determining whether a switch to selective replacement or store-through mode is beneficial. Other information may include the number of requests that require obtaining a cache line from main memory after that cache line was stored from the processing node to main memory within a predetermined period of time. This data may be useful in determining whether a mode switch to comprehensive replacement mode should be triggered. Additional collected information might include the number of requests that are completed by retrieving data from the shared cache after that data was stored to cache following a WB operation. This information may be used to determine whether it is beneficial to transition between comprehensive and one of the other replacement modes, for example. Data associated with cache faults may likewise be collected.

After system information is collected for a predetermined period of time, a mode transition may be triggered by comparing the collected system information to programmable threshold values stored in threshold registers 292. For example, if cache faults exceeded a predetermined fault threshold value within the predetermined time period, a transition to cache-not-present mode may be initiated (506). If the number of requests for cache lines that were retained within cache because of WB operations is less than a minimum threshold value within the predetermined time period, a transition from comprehensive replacement to another one of the replacement modes may be triggered (508). On the other hand, if the current mode of operation is default or selective replacement mode, and the number of cache misses for cache lines that were recently returned to main memory during a WB operation exceeds a predetermined threshold, a mode switch to comprehensive replacement mode may be triggered (510). According to still another scenario, if the mode of operation is set to default or comprehensive replacement mode, and the number of ownership requests that result in request to main memory exceeds a predetermined threshold in the time period, a switch to selective replacement mode or store-through mode may be performed (512).

The process of FIG. 5 may be repeated as long as the mode switch logic is enabled. In one embodiment, reference mode indicator 218 may only be modified once in a predetermined period of time to prevent a situation wherein conflicting system data might otherwise cause the repetitive changing of the storage mode.

It will be appreciated that the method of FIG. 5 is merely exemplary. Other system information may be collected and used to determine the optimal storage mode. In one embodiment, multiple conditions may be logically combined to trigger the mode switch. For example, the triggering of a mode switch may require the satisfaction of multiple threshold conditions. In yet another embodiment, information collected by the operating system regarding the software applications that are executing within the various processing nodes at a given time may be scanned into programmable registers within mode switch logic 290. As discussed above, this information may describe how data is being shared within a processing node, and between multiple processing nodes. This information may be used along with the other collected system information to trigger a mode switch.

While FIG. 5 provides an exemplary method of selecting a setting for storage mode indicator 218, similar methods are available for selecting settings for use in one or more of fields 282-286.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following Claims and their equivalents.

What is claimed is:

1. A method of controlling a memory system having cache tags to record which data is stored within one or more associated caches and a main memory coupled to the cache tags, and further having one or more programmable control indicators, comprising:
   a.) obtaining data by providing a request for the data to, and receiving the data from, the main memory;
   b.) determining whether or not to update the cache tags to record the data based on the state of one or more of the control indicators; and
   c.) determining whether or not to store the data in a predetermined one of the associated caches based on the state of one or more of the control indicators;
   wherein programmably altered control indicators affect at least one or both of the determining steps; and
   wherein the request is any one of multiple types, wherein one of the control indicators identifies one or more of the multiple request types, and wherein at least one of the determining steps is performed based, at least in part, upon whether the request is any of the identified response types.

2. The method of claim 1, wherein the data is provided from the main memory with a response type that is any one of multiple response types, wherein one of the control indicators identifies one or more of the multiple response types, and wherein at least one of the determining steps is performed based, at least in part, upon whether the request is any of the identified response types.

3. The method of claim 1, wherein the memory system is coupled to at least one requester, wherein one of the control indicators identifies one or more of the at least one requester, and wherein at least one of the determining steps is performed based, at least in part, upon whether the request was initiated by any of the identified requesters.

4. The method of claim 1, wherein the memory system is coupled to at least one requester, and wherein step a.) includes obtaining the data from any one of the at least one requester.

5. The method of claim 4, wherein the data is obtained during an operation that is any of multiple operation types, wherein one of the control indicators identifies one or more of the operation types, and wherein at least one of the determining steps is based, at least in part, on whether the data is obtained during any of the identified operation types.

6. The method of claim 5, wherein at least one of the determining steps is based, at least in part, on whether a cache hit occurs.

7. The method of claim 4, wherein the memory system includes a main memory, and further including providing the data to the main memory instead of storing the data into the predetermined one of the associated caches.

8. The method of claim 7, wherein the data is associated with incomplete memory coherency actions, and further including preventing the data from being provided to the main memory until all incomplete memory coherency actions have been completed.

9. A method of controlling a memory system having cache tags to record which data is stored within one or more associated caches, and further having one or more programmable control indicators, comprising:

a.) obtaining data;
b.) determining whether to update the cache tags to record the data based on the state of one or more of the control indicators;
c.) monitoring conditions within the memory system; and
d.) automatically re-programming at least one of the one or more programmable control indicators based on one or more of the monitored conditions utilizing a selectively actuatable mode switch.

10. A memory system, comprising:
a cache system including a plurality of cache memories;
a requester input and a requester output responsive to selected ones of a plurality of requesters to request data from the cache system and to store data to the cache system, respectively;
a main memory to provide requested data that is not stored within the cache system;
cache tag logic;
a programmable storage device to store one or more indicators, different ones of the indicators selectively alterable for controlling different sequences of data transfers;
a control circuit coupled to the requester input and the requester output, the programmable storage device, the cache system, and to the cache tag logic, the control circuit
  to receive data and to determine, based on the state of the one or more indicators, whether or not to update the cache tag logic to track the data, and
  based on the state of the one or more indicators, to determine whether or not to store the data in the cache system, and if so, to replace the received data in the cache system.

11. The memory system of claim 10, wherein one of the indicators indicates one of the cache memories is not available for use.

12. The memory system of claim 10, wherein the main memory provides data to the cache system in response to a request that is any one of multiple request types, wherein at least one of the indicators identifies one or more of the request types, and wherein the control circuit prevents the replacement of the data in the cache if the data was provided in response to any of the identified request types.

13. The memory system of claim 10, wherein the one or more request types includes a request type indicating the data will be modified by one of the plurality of requesters.

14. The memory system of claim 10, wherein at least one of the indicators identifies ones of the plurality of requesters, and wherein the control circuit replaces the data in the cache system if the data was returned from the main memory in response to a request issued by any of the identified ones of the plurality of requesters.

15. The memory system of claim 10, wherein the main memory provides data to the cache system with a response that is any one of multiple response types, wherein at least one of the indicators identifies one or more of the response types, and wherein the control circuit replaces the data in the cache system if the data is returned from the main memory with any of the identified response types.

16. The memory system of claim 10, wherein the programmable storage device includes circuits to store microcode, and wherein the control circuit is controlled by the microcode.

17. The memory system of claim 10, and further including mode switch logic coupled to the programmable storage device to automatically reprogram at least one of the indicators in response to monitored conditions occurring within the memory system.

18. A memory system, comprising:
a programmable storage device to store one or more indicators, different ones of the indicators adapted for controlling different sequences of data transfers;
a cache;
cache tag logic;
a control circuit coupled to the programmable storage device, the cache, and to the cache tag logic, the control circuit to receive data and to determine, based on the state of the one or more indicators, whether or not to update the cache tag logic to track the data and whether to store the data to the cache; and
at least one requester coupled to the control circuit to return data to the cache tag logic, and wherein the control circuit determines whether or not to store the returned data to the cache based on the state of at least one of the indicators.

19. The memory system of claim 18, wherein the at least one requester returns data to the cache tag logic during an operation that is any one of multiple operation types, wherein the indicators include an indicator to identify one or more of the operation types, and wherein the control circuit stores the returned data to the cache if the returned data is returned during any of the identified operation types.

20. The memory system of claim 1, wherein the control circuit is further adapted to store the returned data to the cache based, at least in part, on whether a cache hit occurred.

21. The memory system of claim 18, and further including a main memory coupled to the control circuit, and wherein the control circuit is adapted to forward the returned data to the main memory based, at least in part, on the state of at least one of the indicators.

22. The memory system of claim 21, wherein memory coherency actions may be incomplete for the returned data or for associated data retained by the at least one requester or the cache, and further including a request tracking circuit coupled to the control circuit to prevent the returned data from being forwarded to the main memory until all of the memory coherency actions have been completed for the returned data or for the associated data.

23. A memory system, comprising:
main memory means for storing data and for receiving requests to retrieve data;
cache means for storing a subset of the data;
programmable storage means for storing control indicators to determine how the subset of the data is to be selected, the programmable storage means further including means for selecting the subset of the data based, at least in part, on a type of request that was issued to retrieve the subset of the data from the main memory; and
one or more requester means for causing data to be retrieved from the main memory, and wherein the programmable storage means includes means for selecting the subset of the data based, at least in part, on the identity of one or more of the requester means that caused data to be retrieved from the main memory.

24. The memory system of claim 23, wherein the main memory means for returning a response type to the cache means with data, and wherein the programmable storage means includes means for selecting the subset of the data based, at least in part, on the response type.

25. The memory system of claim 23, and further including mode switch means for modifying the state of one or more of the control indicators based on monitored conditions occurring within the memory system.

26. The memory system of claim 23, and wherein the cache means includes cache tag means for tracking data that may be stored to the cache means, and wherein the programmable storage means includes means for determining whether to update the cache tag means to track data.

27. The memory system of claim 26, wherein the programmable storage means includes means for enabling the tracking by the cache tag means of predetermined data that is not included in the subset of the data stored within the cache means.

28. A memory system, comprising:
  main memory means for storing data and for receiving requests to retrieve data;
  cache means for storing a subset of the data;
  programmable storage means for storing control indicators to determine how the subset of the data is to be selected, the programmable storage means further including means for selecting the subset of the data based, at least in part, on a type of request that was issued to retrieve the subset of the data from the main memory;
  requester means for returning data to the cache means, and wherein the programmable storage means includes means for selecting whether data returned by the requester means will be stored to the cache means; and
  wherein the requester means includes means for returning data during any of multiple types of operations, and wherein the programmable storage means includes means for selecting whether returned data will be stored to the cache means based, at least in part, on the type of operation that resulted in return of the data.

29. The memory system of claim 28, wherein the programmable storage means includes means for selecting whether data returned by the requester means will be stored to the cache means based, at least in part, on whether a cache miss occurred to the cache means.

* * * * *